US011029862B2

(12) United States Patent
Blount

(10) Patent No.: US 11,029,862 B2
(45) Date of Patent: Jun. 8, 2021

(54) SYSTEMS AND METHODS FOR REDUCING WRITE TAX, MEMORY USAGE, AND TRAPPED CAPACITY IN METADATA STORAGE

(71) Applicant: NetApp, Inc., Sunnyvale, CA (US)

(72) Inventor: Joseph Blount, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 158 days.

(21) Appl. No.: 15/496,206

(22) Filed: Apr. 25, 2017

(65) Prior Publication Data

US 2018/0307425 A1 Oct. 25, 2018

(51) Int. Cl.
*G06F 3/06* (2006.01)

(52) U.S. Cl.
CPC ............ *G06F 3/0631* (2013.01); *G06F 3/061* (2013.01); *G06F 3/0689* (2013.01)

(58) Field of Classification Search
CPC .. G06F 3/0631; G06F 11/1435; G06F 3/0604; G06F 2212/7207
See application file for complete search history.

(56) References Cited

U.S. PATENT DOCUMENTS

| 8,539,150 | B2 * | 9/2013 | Araki | G06F 12/0871 |
| | | | | 711/113 |
| 2010/0306448 | A1 * | 12/2010 | Chen | G06F 12/0804 |
| | | | | 711/103 |
| 2011/0289049 | A1 * | 11/2011 | Zeng | G06F 17/30312 |
| | | | | 707/611 |
| 2013/0013561 | A1 * | 1/2013 | Chan | G06F 16/172 |
| | | | | 707/636 |
| 2013/0185503 | A1 * | 7/2013 | Bhatta | G06F 17/30191 |
| | | | | 711/114 |
| 2014/0108723 | A1 * | 4/2014 | Nowoczynski | G06F 12/0866 |
| | | | | 711/113 |
| 2014/0359248 | A1 * | 12/2014 | Peters | G06F 12/0223 |
| | | | | 711/171 |
| 2015/0186549 | A1 * | 7/2015 | French | G06F 17/30946 |
| | | | | 707/792 |
| 2017/0371909 | A1 * | 12/2017 | Andrei | G06F 16/282 |

OTHER PUBLICATIONS

Patrick O'Neil, et al., The Log-Structured Merge-Tree (LSM-tree), University of Massachusetts, Boston, MA, Apr. 11, 1995, 35 pgs.

* cited by examiner

*Primary Examiner* — Michelle T Bechtold
(74) *Attorney, Agent, or Firm* — Haynes and Boone, LLP

(57) ABSTRACT

A system and method for metadata storage includes use of a storage controller to receive a write operation from a host, create a metadata entry for storing metadata associated with data written by the write operation, and store the metadata entry into a metadata store. The metadata store includes a plurality of active partitions, a plurality of inactive partitions, and a queue identifying locations in the active partitions where the metadata entry may be stored. The metadata store is further used to access data written to one or more storage devices. Storing the metadata entry into the metadata store includes popping a first location from the queue, identifying a first active partition from the active partitions based on the first location, and storing the metadata entry in the first active partition. In some embodiments, each of the active partitions may be organized into two or more tiers.

20 Claims, 5 Drawing Sheets

SYSTEMS AND METHODS FOR REDUCING WRITE TAX, MEMORY USAGE, AND TRAPPED CAPACITY IN METADATA STORAGE

TECHNICAL FIELD

The present description relates to data storage systems, and more specifically, to structures used to store metadata for tracking stored data within the data storage systems.

BACKGROUND

In some storage systems, such as high-availability storage systems, data that is input from one or more hosts may be persisted to one or more storage devices logically grouped as one or more volumes before metadata regarding the input is updated. For example, in some storage systems indirection may be used to map (e.g., the metadata regarding the input) between the addresses provided by one or more hosts to identify volumes and the logical and physical locations of the storage devices maintained by the storage system. This enables the hosts to generically interface with the storage system without having to know the particular configuration of the specific storage system or where the data is ultimately stored.

When indirection is used, metadata in the system is generally maintained and updated by the storage system in a metadata store to track important properties of the user data, such as the physical location where that data is stored within the storage system. When modifying metadata associated with a large amount of user data, direct updates of the metadata structures can consume large amounts of system resources, since that metadata may be scattered across the storage system's internal storage resources. Instead of performing expensive direct updates of scattered metadata structures, at least a portion of the metadata may be maintained in volatile system memory and periodically persisted to nonvolatile storage, such as by using a merge operation; thus creating a multi-tiered metadata store.

Current approaches to maintaining the metadata are typically forced to make tradeoffs between the speed of write operations on the metadata store, the overhead costs of maintaining the metadata store and persisting it to nonvolatile storage, and storage inefficiencies in the storage system due to the use of the multi-tiered metadata store. Accordingly, it would be advantageous to have improved structures and systems by which to implement metadata stores.

BRIEF DESCRIPTION OF THE DRAWINGS

The present disclosure is best understood from the following detailed description when read with the accompanying figures.

DETAILED DESCRIPTION

Figure 1:
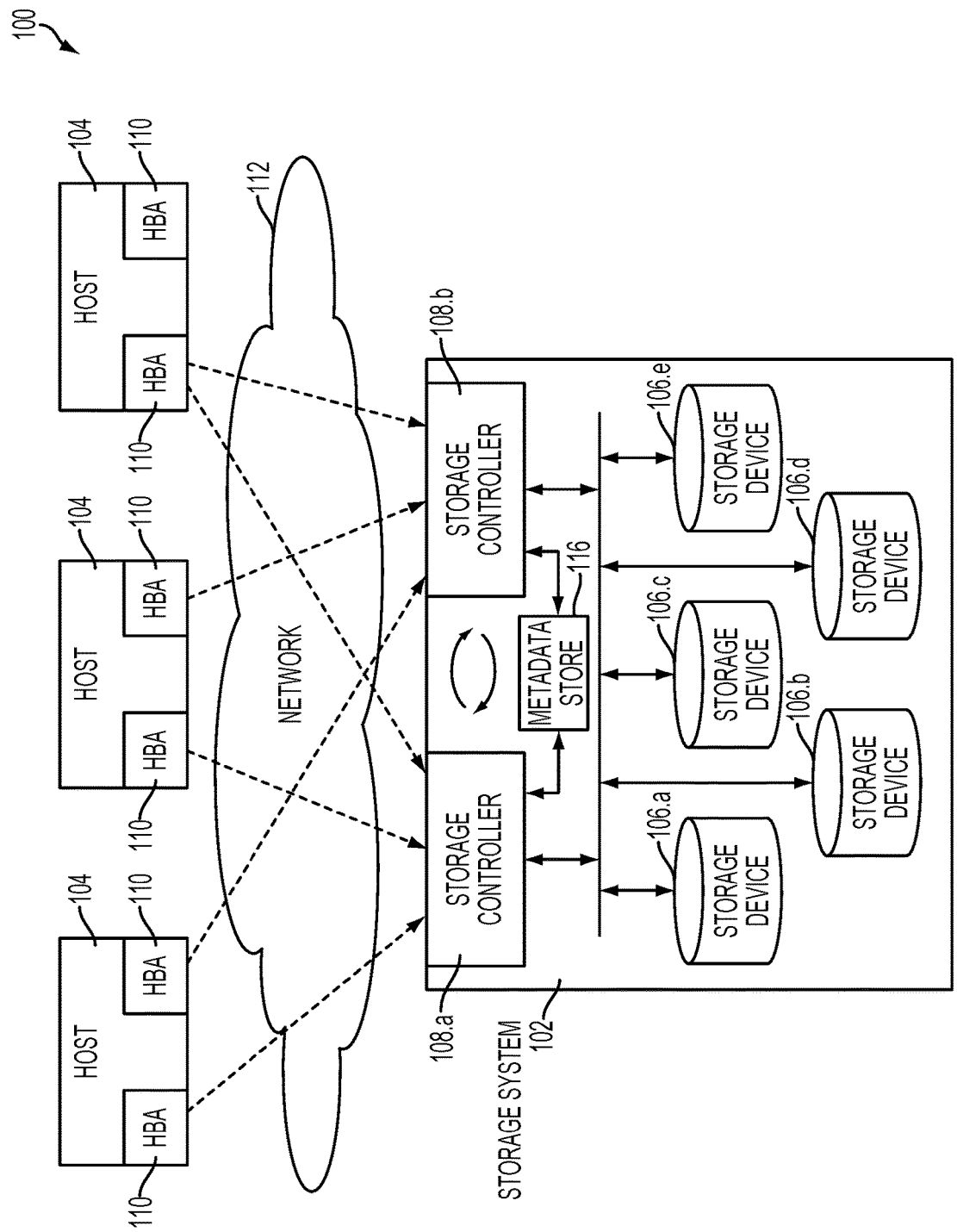
FIG. 1 is an organizational diagram of an exemplary data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for maintaining metadata within in a storage system. As data is written to a distributed storage system, such as a network- or cloud-based storage system, it is typically broken up into one or more blocks or groups of blocks (sometimes called an extent), which are then stored on one or more storage devices within the storage system that have empty space capable of storing the blocks or groups of blocks. In order to keep track of where each of the blocks or groups of blocks are being stored, the storage system typically creates a catalog containing information about each of the blocks or groups of blocks, such as how large they are, where they are stored, when they were stored, etc. This information is collectively referred to as metadata (i.e., data about the data). Organization of this catalog, or metadata store is very important in order to ensure that the blocks or groups of blocks can be found, that data can be written quickly to the storage system, and that the catalog can be quickly searched and maintained.

To improve the speed at which the catalog can be updated and searched, the catalog is typically broken up into two or more layers or tiers. As updates to the catalog are received (e.g., due to the writing of data to one or more blocks or groups of blocks), the metadata is first added to a first storage tier that can be quickly updated. This first storage tier is typically kept small as it is relatively more expensive than other storage tiers due to its speed. Once this small storage tier fills up or gets mostly full, it is merged in with the metadata previously stored in a second tier that is larger and slower than the first storage tier, thus freeing up the first storage tier to receive more metadata. As the merging occurs, the metadata from the first storage tier is either added to the second storage tier or replaces metadata in the second storage tier that has been updated by a write operation that occurred since the previous merge. As the second storage tier fills up or gets mostly full it is merged into a third storage tier and so on depending upon the number of storage tiers used for the catalog. Typically, a tiered catalog like this has two or three tiers.

Breaking the catalog into multiple tiers tends to allow updates to the catalog to occur very quickly because of the fast first storage tier. This, however, doesn't come without a cost. For example, there are several costs associated with merging each of the storage tiers into the previously stored storage tiers (e.g., from the first to the second, the second to the third, etc.). Depending upon the implementation, these merging costs may include additional wear on the storage devices, increased use of network resources, and increased computational costs. Generally, this merging cost may be reduced by making the first storage tier and the other intervening storage tiers as large as possible. (The size of the last and slowest storage tier is limited in size based on the number of storage devices used to store the data being tracked by the catalog.) As another example, because the first storage tier is not immediately merged into the second storage tier (and the second into the third, etc.) there are often out-of-date catalog entries in the second, third, and other storage tiers that identify data areas on the storage devices that can be freed up for the storage of new data, but may not be freed up right away because they still have an entry in the catalog. This causes the inefficient use of the storage devices used to store the data because they are storing data that is no longer up to date. Generally, this efficiency cost can be reduced by making the first storage tier and the other intervening storage tiers as small as possible so that merging occurs more frequently. Thus, neither of the merging and efficiency costs can be reduced without increasing the other one.

One solution to help with these cost trade-offs is to split up or partition the catalog into smaller sub-catalogs. Each of the sub-catalogs then has its own first, second, third, etc. storage tiers that are smaller than a comparable full catalog that is not split up. This means that the merges within each sub-catalog are less costly than a full catalog merge. And depending upon how new metadata is added to the sub-catalogs, the merges may occur more often and help reduce the inefficient or erratic use of the storage devices.

One way to improve the use of the sub-catalogs is to add new metadata to just a small number of the sub-catalogs at a time and restrict the adding of new metadata to the other sub-catalogs. In order to do this, the catalog maintains a list of active sub-catalogs and locations within the sub-catalogs where the new metadata entries may be added. This means that the active addition of metadata is concentrated within these active sub-catalogs so that the first storage tiers of those sub-catalogs fill up more quickly, merges occur more often, and the inefficiency of the storage devices is correspondingly reduced. This increase in the efficiency of the storage devices is sufficiently higher than the full catalog arrangement so that the size of the first, second, etc. (i.e., upper) storage tiers may be increased (to reduce the cost of the merges) without having to trade off all the gains in the efficiency of the storage devices obtained by the more frequent merges. In addition, it is even possible to perform merges of the upper storage tiers before they fill up and still maintain advantages over the full catalog arrangement.

Further, by merging a sub-catalog to the lowest storage tier and making the sub-catalog inactive when the list of active sub-catalogs and locations no longer contains any locations for that sub-catalog, the first, second, and other upper storage tiers for that sub-catalog may be used by another sub-catalog. This reduces the overall cost of the system as the total amount of the more expensive first, second, and other upper storage tiers is reduced.

As a result, a storage system is able to more efficiently process metadata changes with lower merging costs to maintain the metadata catalog without having to make as large a sacrifice in storage device inefficiency. In addition the overall costs of the storage used to store the metadata catalog is also reduced.

FIG. 1 illustrates a data storage architecture 100 in which various embodiments may be implemented. Specifically, and as explained in more detail below, one or both of the storage controllers 108.a and 108.b read and execute computer readable code to perform the methods described further herein to maintain a write-ahead log during system operation and use the write-ahead log to replay changes to metadata clients in volatile memory after an interruption.

The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions (e.g., requests to write and/or read data) from one or more of the hosts 104, and take an action such as reading, writing, or otherwise accessing the requested data. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The instructions may, when executed by the processor, cause the processor to perform various operations described herein with the storage controllers 108.a, 108.b in the storage system 102 in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a multicore processor, a microcontroller, an application-specific integrated circuit (ASIC), a fireld programmable gate array (FPGA), and/or the like. The computing system may also include a memory device such as random access memory (RAM); a non-transitory machine-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 and responds to transactions from one or more the hosts 104 so that the storage devices 106 may appear to be directly connected (local) to the hosts 104. In various examples, the storage devices 106 include hard disk drives (HDDs), solid state drives (SSDs), flash drives, optical drives, any other suitable volatile or non-volatile data storage medium, and/or any combination thereof. In some embodiments, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance.

The storage system 102 may group the storage devices 106 for speed and/or redundancy using a virtualization technique such as RAID or disk pooling (that may utilize a RAID level). The storage system 102 also includes one or more storage controllers 108.a, 108.b in communication with the storage devices 106 and any respective caches. The storage controllers 108.a, 108.b exercise low-level control over the storage devices 106 in order to execute (perform) data transactions on behalf of one or more of the hosts 104. The storage controllers 108.a, 108.b are illustrative only; more or fewer may be used in various embodiments. Having at least two storage controllers 108.a, 108.b may be useful, for example, for failover purposes in the event of equipment failure of either one. The storage system 102 may also be communicatively coupled to a user display for displaying diagnostic information, application output, and/or other suitable data.

In an embodiment, the storage system 102 may group the storage devices 106 using a dynamic disk pool (DDP) (or other declustered parity) virtualization technique. In a DDP, volume data, protection information, and spare capacity are distributed across all of the storage devices included in the pool. As a result, all of the storage devices in the DDP remain active, and spare capacity on any given storage device is available to all volumes existing in the DDP. Each storage device in the DDP is logically divided up into one or more data extents (which may also be referred to as data blocks herein) at various block addresses of the storage device. A data extent (or block) is assigned to a particular data stripe of a volume.

An assigned data extent becomes a "data piece," and each data stripe has a plurality of data pieces, for example sufficient for a desired amount of storage capacity for the volume and a desired amount of redundancy, e.g. RAID 0, RAID 1, RAID 10, RAID 5 or RAID 6 (to name some examples). As a result, each data stripe appears as a mini RAID volume, and each logical volume in the disk pool is typically composed of multiple data stripes. Further, according to embodiments of the present disclosure, one or more data stripes may compose a given segment as used herein (i.e., a segment may include some integer number of data stripes).

In addition, the storage system 102 may also include a metadata store 116. In an embodiment, the metadata store 116 may also be grouped using DDP as a virtualization technique. The metadata store 116 may serve to store metadata regarding data (e.g., written from one or more hosts 104) in the storage devices 106. In an embodiment, write data may be received from one or more hosts 104 and momentarily stored in a write-back cache of the storage system 102, e.g. using logical block addresses (LBAs). The metadata store 116 may house one or more types of metadata to facilitate translating the specified LBAs of the data in the write-back cache to block addresses used by the storage devices 106. The metadata store 116 may be composed of one or more storage devices, such as one or more memories, solid-state devices, disk drives, and/or the like as is described in further detail below.

For example, the metadata store 116 may house a tree data structure (referred to more generally as a mapping table) that facilitates translation of a specified volume/LBA to a back-end repository address and is sometimes referred as in indirection table for this reason. The metadata store 116 may also include mapping tables (e.g., a global index that maps between identifiers used in the mapping tables such as tree data structure and block addresses (the physical locations) used for the storage devices 106). There may be multiple types of tables, trees, and/or logs according to embodiments of the present disclosure as is discussed in further detail below. In some embodiments, the metadata store 116 may function as a binary large object (BLOB) identifier store that includes one or more lookup structures suitable for locating BLOBs stored in storage devices 106.

In the examples of FIG. 1, storage controllers 108.a and 108.b are arranged as an HA pair. Thus, when storage controller 108.a performs a write operation for a host 104, storage controller 108.a may also send a mirroring write operation to storage controller 108.b. Similarly, when storage controller 108.b performs a write operation, it may also send a mirroring write operation to storage controller 108.a. Each of the storage controllers 108.a and 108.b has at least one processor executing logic to maintain and/or aid in maintaining the metadata store 116 according to embodiments of the present disclosure.

With respect to the hosts 104, a host 104 includes any computing resource that is operable to exchange data with storage system 102 by providing (initiating) data transactions to the storage system 102. In an exemplary embodiment, a host 104 includes a host bus adapter (HBA) 110 in communication with a storage controller 108.a, 108.b of the storage system 102. The HBA 110 provides an interface for communicating with the storage controller 108.a, 108.b, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

According to embodiments of the present disclosure, when a write operation is sent from a host 104 to the storage system 102, a storage controller 108 (either 108.a or 108.b) may write the data to the destination on one or more storage devices 106. The storage controller 108 may then create a metadata entry that defines what metadata changes to reflect the write operation. The storage controller 108 may aggregate multiple of these types of metadata changes for multiple host actions (e.g., to different or same volumes/data) into a given metadata entry. The storage controller 108 may then update the metadata store 116 with the new metadata entry. In addition, the storage controller 108 may persist the metadata object to a log to support transactions, failure recovery, and/or the like.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a WAN, and/or a LAN. Fibre Channel and FCoE are well suited for embodiments where hosts 104 are coupled to the storage system 102 via a direct connection or via Fibre Channel switches. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CIFS, SAMBA, and NFS. A Network Attached Storage (NAS) device is a type of storage system that responds to file-level transactions. As another example, embodiments of the present disclosure may utilize object-based storage, where objects are instantiated that are used to manage data instead of as blocks or in file hierarchies. In such systems, objects are written to the storage system similar to a file system in that when an object is written, the object is an accessible entity. Such systems expose an interface that enables other systems to read and write named objects, that may vary in size, and handle low-level block allocation internally (e.g., by the storage controllers 108.a, 108.b). It is understood that the scope of present disclosure is not limited to either block-level or file-level protocols or object-based protocols, and in many embodiments, the storage system 102 is responsive to a number of different data transaction protocols.

Figure 2:
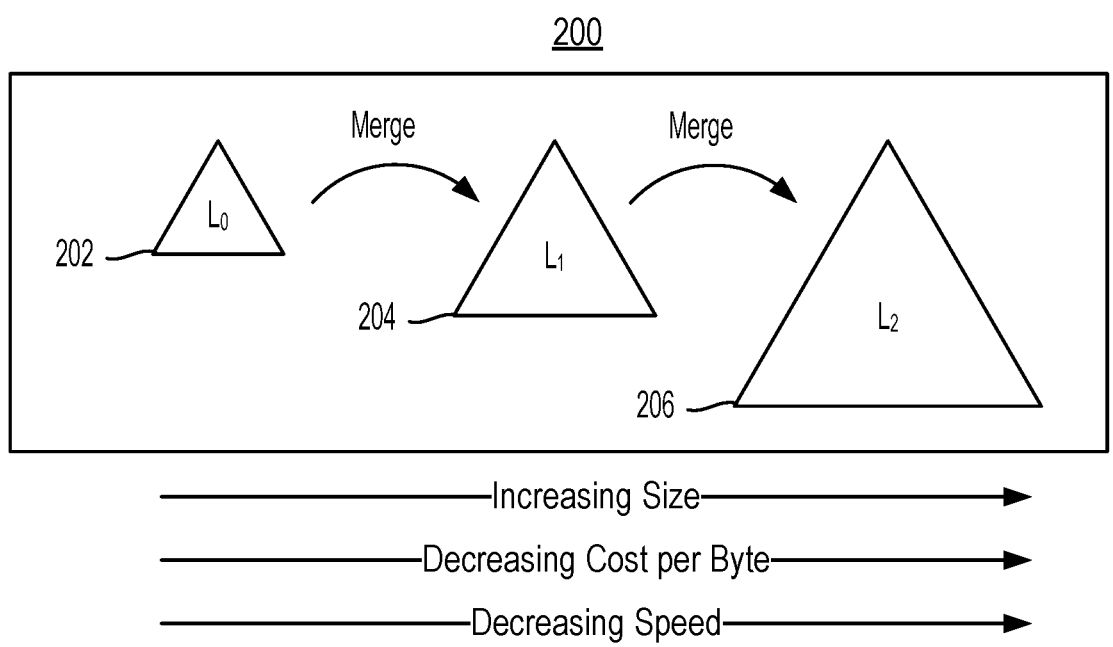
FIG. 2 is an organizational diagram of an exemplary metadata storage architecture according to aspects of the present disclosure.

FIG. 2 is an organizational diagram of an exemplary metadata storage architecture 200 according to aspects of the present disclosure. In some embodiments, architecture 200 is suitable for use in the implementation of metadata store 116. As shown in FIG. 2, architecture 200 uses a three-tiered model composed of a tier $L_0$ 202, a tier $L_1$ 204, and a tier $L_2$ 206. And although architecture 200 is shown with three tiers, the number of tiers is to aid in explanation, and it is understood that other numbers of tiers, such as two, four, or more, are possible. The use of multiple tiers in architecture 200 is designed to take advantage of the characteristics of different types of memory and storage that may be used to implement architecture 200. In some examples, tier $L_0$ 202 is stored in fast and expensive (cost per byte) storage, such as a cache memory. Tier $L_1$ 204 is stored in a comparatively slower and less expensive storage, such as a main memory. And tier $L_2$ 206 is stored in a comparatively even slower and less expensive storage, such as a disk drive. In some examples, tier $L_0$ 202 is stored in main memory and tier $L_1$ 204 and tier $L_2$ 206 are stored in a storage device, such as a disk drive. Due to the relative costs and/or to optimize for functionality or wear on storage devices, tier $L_0$ 202 is comparatively smaller than tier $L_1$ 204, which is comparatively smaller than tier $L_2$ 206.

As metadata changes are received by the storage system they are quickly written (i.e., cached) into the fast tier $L_0$ 202. As tier $L_0$ 202 begins to reach capacity, such as by growing in size beyond a configurable threshold (e.g., 70 percent or more of allocated space), some or all of the data stored in tier $L_0$ 202 is flushed and gets merged into the data previously stored in tier $L_1$ 204 by a previous merge using a write-back style of updating. This may include adding entries from tier $L_0$ 202 into tier $L_1$ 204 that don't correspond to existing entries already in tier $L_1$ 204 or replacing entries in tier $L_1$ 204 that have been superseded by later writes in tier $L_0$ 202. As tier $L_1$ 204 begins to reach capacity, it is similarly flushed and merged into tier $L_2$ 206. As the lowest tier in architecture 200, tier $L_2$ 206 includes a "full" copy of the metadata stored in architecture 200 except for any recent updates being temporarily cached in tiers $L_0$ 202 and $L_1$ 204. In some examples, in order to provide more fault tolerance for the metadata in tier $L_0$ 202, tier $L_1$ 204, and/or tier $L_2$ 206 other techniques, such as write logs, duplication, persistent storage, and/or the like are also used.

In some embodiments, each of the tiers $L_0$ 202, $L_1$ 204, and $L_2$ 206 is implemented using any suitable structure that can be quickly searched and updated to facilitate, for example, identifying a storage device and location within a storage device based on a logical block address being requested by a host. In some examples, each of the tiers $L_0$ 202, $L_1$ 204, and $L_2$ 206 may be implemented using a tree structure, such as a binary tree, B-tree, red-black tree, and/or the like. In some examples, each of the tiers $L_0$ 202, $L_1$ 204, and $L_2$ 206 may be indexed. In some examples, architecture 200 may be characterized as a log-structured merge (LSM) tree.

Implementation of architecture 200 is generally subject to several competing design trade-offs used to select the sizes of tiers $L_0$ 202 and $L_1$ 204 as well as the various merge-triggering thresholds. The costs of merging tier $L_0$ 202 into tier $L_1$ 204 and merging tier $L_1$ 204 into tier $L_2$ 206 (such as increased were on the storage devices, increased network bandwidth, increased computational costs, and/or the like) is not trivial and represents a write tax on the maintenance of architecture 200. In general, this merging cost may be reduced by making tiers $L_0$ 202 and $L_1$ 204 as large as possible (e.g., to reduce the frequency of merging), subject to a practical upper limit due to the increased expense for the storage used to implement tiers $L_0$ 202 and $L_1$ 204.

The use of the caching model in architecture 200 also reduces storage efficiency of both architecture 200 and of the storage devices storing the underlying data being tracked within the metadata stored in architecture 200. This is because tier $L_2$ 206 is generally not up to date and may still include metadata entries related to blocks and/or extents stored in the storage devices that have been superseded and can be marked for deletion and recovery by a garbage collection operation and represents a trapped capacity of the storage devices that is temporarily not available for the storage of new and/or updated data. In some examples, this reduction in efficiency may be significant when the storage system uses a storage model where write operations write data to new storage blocks and/or extents rather than overwriting data previously stored at the corresponding logical block addresses. In general, this efficiency cost may be reduced by reducing the size of tiers $L_0$ 202 and $L_1$ 204 (e.g., to increase the frequency of merging).

Because of the competing demands to reduce the merging costs of the write tax (by increasing the sizes of tiers $L_0$ 202 and $L_1$ 204 and/or reducing the frequency of merges) and to improve storage efficiency to reduce trapped capacity (by decreasing the sizes of tiers $L_0$ 202 and $L_1$ 204 and/or increasing the frequency of merges), the designer of an implementation of architecture 200 faces the difficult task of tuning the implementation based on the usage and other factors associated with the storage system. Because this may change with changing use of the storage system it may be difficult to keep the implementation optimally tuned.

Figure 3:
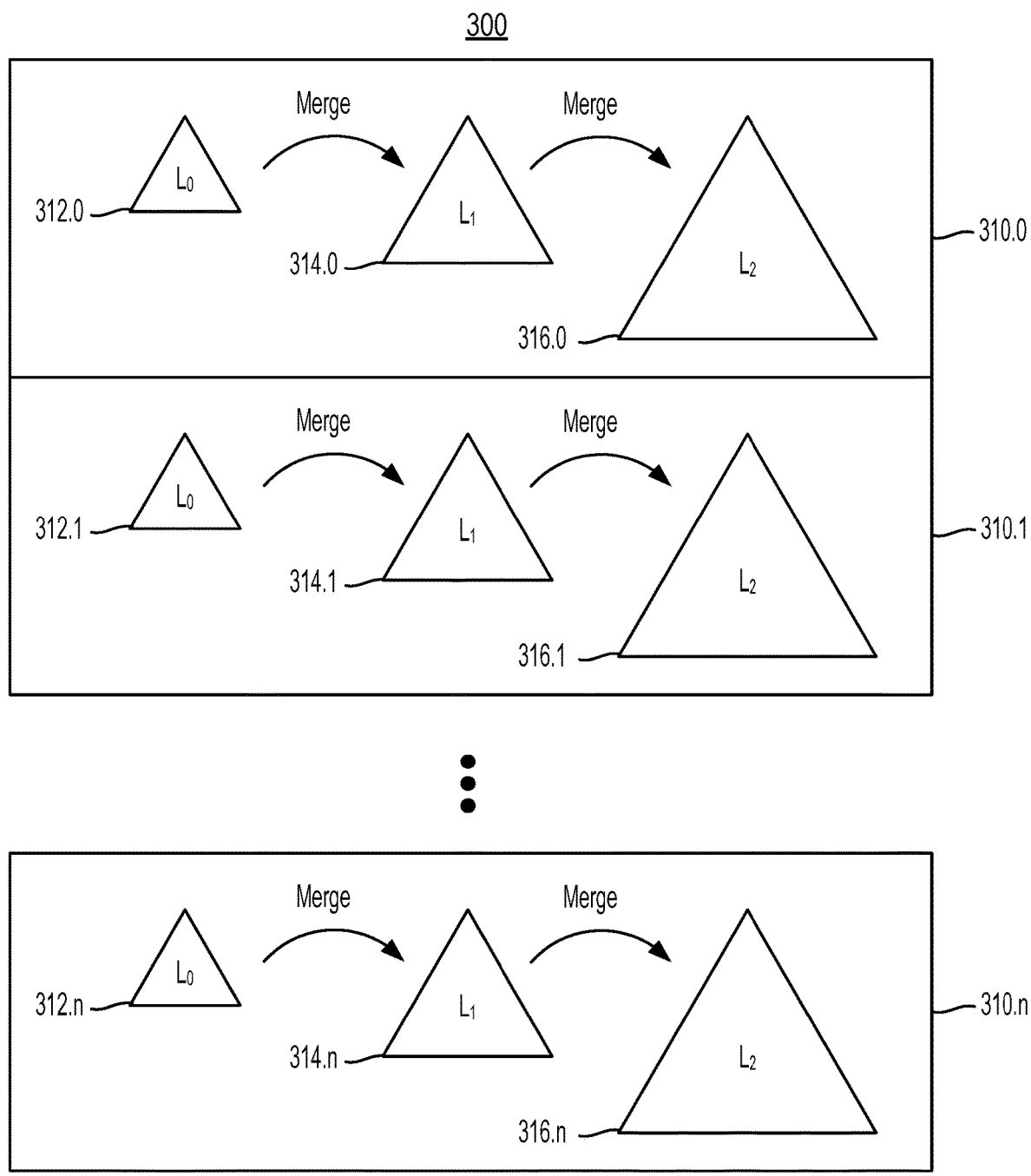
FIG. 3 is an organizational diagram of an exemplary partitioned metadata storage architecture according to aspects of the present disclosure.

One possible solution to mitigate the effects of the tension between merging cost and storage efficiency is to partition the metadata store into a group of metadata stores storing respective portions of the full metadata store. FIG. 3 is an organizational diagram of an exemplary partitioned metadata storage architecture 300 according to aspects of the present disclosure. In some embodiments, architecture 300 is suitable for use in the implementation of metadata store 116. As shown in FIG. 3, architecture 300 uses the tiered storage model of architecture 200, but rather than maintaining the metadata within a set of tiers, the metadata store is partitioned into a series of metadata sub-stores or partitions, with each partition being used to store a different portion of the metadata. More specifically, FIG. 3 shows architecture 300 partitioned into a series of partitions 310.0, 310.1, . . . 310.$n$. Depending upon the implementation, the number of partitions (n+1) may be quite large, such as tens of thousands or more. Each of the partitions 310.0, 310.1, . . . 310.$n$ includes its own set of tiers $L_0$ 312.$i$, $L_1$ 314.$i$, and $L_2$ 316.$i$ that are implemented similarly to tiers $L_0$ 202, $L_1$ 204, and $L_2$ 206 of architecture 200.

When a new metadata entry is received for storage in architecture 300, a suitable partition 310.$i$ from partitions 310 is selected and the metadata entry is added to tier $L_0$ 312.$i$ within partition 310.$i$. As tier $L_0$ 312.$i$ reaches its threshold capacity, tier $L_0$ 312.$i$ is merged into tier $L_1$ 314.$i$ and so forth using the same general approach used for architecture 200. One possible side effect of the partitioning within architecture 300 is that it is possible that a merge in a first partition may cause an echoing effect in a second partition because a metadata entry being merged in the first partition may have superseded a metadata entry previously written in the second partition. Depending upon the implementation, partition 310.$i$ may be selected using any suitable algorithm, such as random selection, round robin, and/or the like. In some examples, the selection process may be based on observed metrics associated with each of partitions 310, such as selecting partition 310.$i$ as the partition 310 with a smallest overall size for its tier $L_2$ 316.

Indexing of and navigation through the metadata stored in partitions 310 of architecture 300 may be conveniently implemented by dividing the bits of each index into two portions. A first portion (typically the most significant bits) being used to identify which of the partitions 310 to access and a second portion (typically the remaining least significant bits) being used to index within the tiers of the partition 310 identified by the first portion of bits.

In suitable implementations, a metadata store implemented based on architecture 300 may have advantages with respect to the merging costs of the write tax and the efficiency reductions due to the trapped capacity relative to architecture 200. In some examples, the comparative localization of the merges within each partition 310 tends to reduce the merging costs of the write tax. In some examples, the overall reduction in tree height within the tiers of each partition 310 may also improve the speed of searches within the metadata store.

According to some embodiments and implementations, when the indexes assigned to the metadata entries, which control which of the partitions 310 is used to store the respective metadata entries, are independent of the underlying data, the algorithm used to select a partition 310.$i$ for a next metadata entry may select partition 310.$i$ in such a fashion to further reduce the merging costs of the write tax and mitigate the storage efficiency reduction due to trapped capacity. In some examples, metadata storage index independence from the underlying data may not be possible in storage systems that also want to support an efficient de-duplication mechanism.

Figure 4:
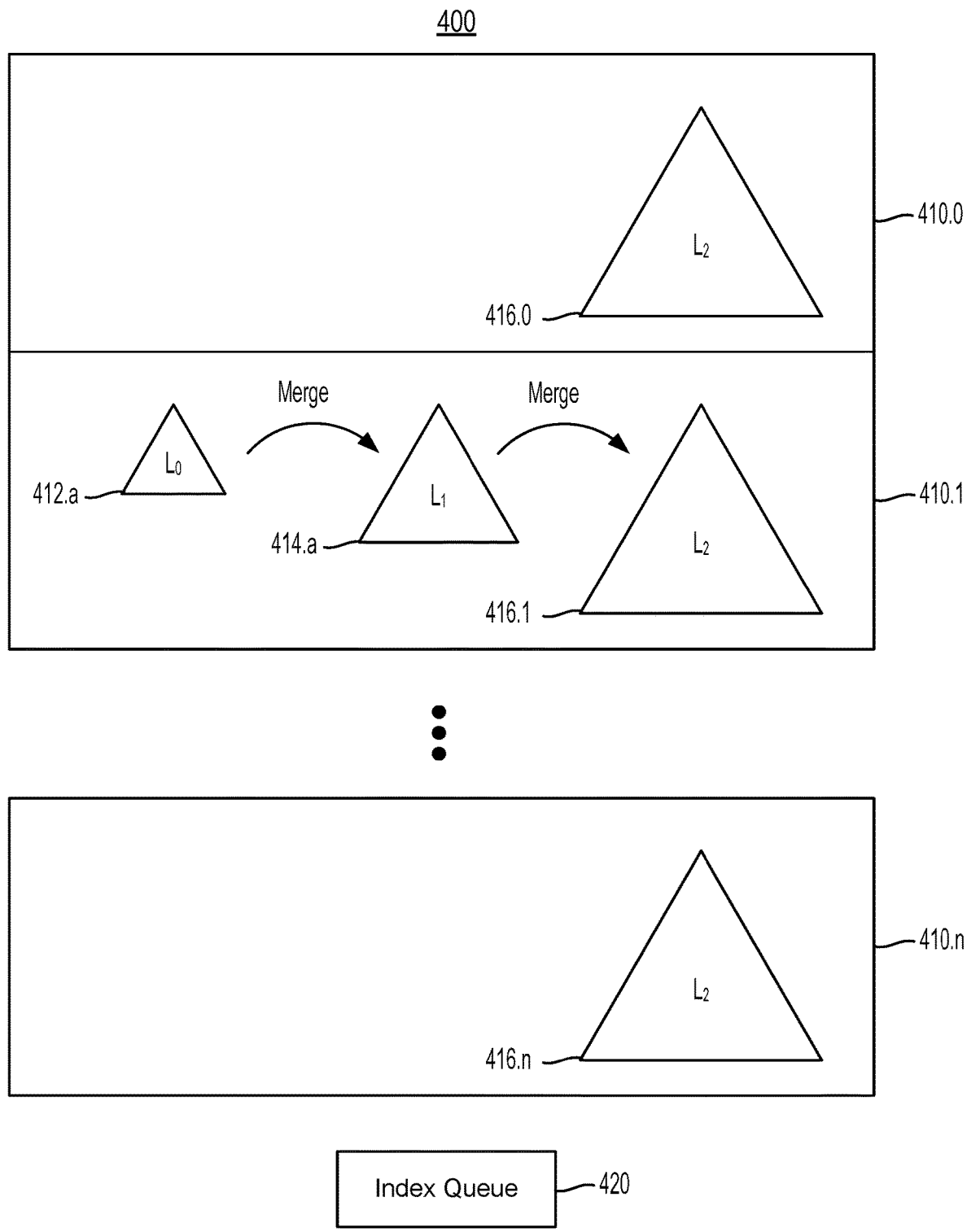
FIG. 4 is an organizational diagram of another exemplary partitioned metadata storage architecture according to aspects of the present disclosure.

In some embodiments, by localizing or limiting the number of partitions 310 being used to actively store new metadata entries, additional improvements in the merging costs of the write tax and mitigate the storage efficiency reduction due to trapped capacity may be obtained. FIG. 4 is an organizational diagram of another exemplary partitioned metadata storage architecture 400 according to aspects of the present disclosure. In some embodiments, architecture 400 is suitable for use in the implementation of metadata store 116. As shown in FIG. 4, architecture 400 uses the partitioned storage model of architecture 300 and includes partitions 410.0, 410.1, . . . 410.$n$ where the number of partitions 410 may be quite large, such as up to tens of thousands or more. In contrast to architecture 300, architecture 400 is designed around a partition selection algorithm that limits the number of partitions 410 that are actively receiving new metadata entries at any one time. In some examples, the number of active partitions 410 may be limited to a configurable and small percentage of the overall number of partitions 410 and may be limited to as few as 10 or less to as many as 50 of more depending upon the total number of partitions. One advantage of keeping the number of active partitions 410 small is that the majority of partitions 410 that are inactive do not have to have a tier $L_0$ or $L_1$ to quickly receive new metadata entries. Thus, and as further shown in FIG. 4, each of the partitions 410 maintains its own respective tier $L_2$ 410.$i$. However, the allocation of storage for tiers $L_0$ and $L_1$ is limited to active partitions, such as partition 410.1 in FIG. 4, which is allocated tier $L_0$ 412.$a$ and tier $L_1$ 414.$a$. In contrast, partitions 410.0 and 410.$n$, which are inactive, are not allocated a tier $L_0$ or a tier $L_1$. In some examples, tier $L_0$ 412.$a$ and tier $L_1$ 414.$a$ are allocated from respective pools of tier $L_0$ and tier $L_1$ storage.

In order to control which partitions 410 are active, architecture 400 further includes an index queue 420. Index queue 420 is used to store validated indexes at which new metadata entries may be stored within architecture 400. By limiting the validated indexes to just the active partitions 410, control over which partitions 410 to use for new metadata entries is maintained. In some examples, the number of validated indexes to add to index queue 420 when a partition 410 is made active may be set to a configurable number or may be selected based on a size of the corresponding tier $L_2$ 416.$i$ when partition 416.$i$ is made active.

When index queue 420 no longer includes validated indexes for a partition 410.$i$, the tiers $L_0$ 412.$a$ and $L_1$ 414.$a$ are fully merged into tier $L_2$ 416.$i$ and the storage for tiers $L_0$ 412.$a$ and $L_1$ 414.$a$, which are now empty, may be moved to their respective storage pools for assignment to another partition $410.j$. In some examples, partition $410.j$ may be selected as the next active partition 410 using any suitable algorithm, such as randomly, by popping from a queue of inactive partitions 410 (i.e., so that the least recently active partition 410 becomes the next active partition 410), based on properties of the inactive partitions 410, and/or the like. In some examples, the properties of the inactive partitions 410 may include the corresponding sizes of each of the inactive partitions 410 (e.g., based on the number of metadata entries in the corresponding tier $L_2$ 416) with the inactive partition $410.j$ with the smallest tier $L_2$ $416.j$ being selected from among the inactive partitions 410.

Concentrating the addition of new metadata entries to a few partitions 410 within architecture 400 provides advantages over architecture 300. In some examples, because the addition of new metadata entries is concentrated in just a few partitions 410, the frequency at which merges from tier $L_0$ to tier $L_1$ and from tier $L_1$ to tier $L_2$ is increased. This improves the storage efficiency by reducing the trapped capacity in the storage system. In some examples, this increase in storage efficiency may also be maintained even when the size of the tier $L_0$ and tier $L_1$ allocations to the active partitions 410 is increased relative to the sizes used for tier $L_0$ 312 and tier $L_1$ 314 used in architecture 300, because trapped capacity is generally related to the sum of the sizes of the storage used for tiers $L_0$ and $L_1$ in all of the partitions 410 combined. In addition, this corresponding increase in the sizes of tiers $L_0$ 312 and $L_1$ 314 helps reduce the merging cost of the write tax due to merges. According to some embodiments, the advantages of architecture 400 over architecture 300 are obtained due to the difference in how the associated merging and efficiency costs are accrued with use of architecture 400 versus architecture 300. In some examples, the inefficiency of the storage devices is determined by the total size of the upper tiers (e.g., tiers $L_0$ and $L_1$) across all of the partitions. In some examples, the merging cost is dictated by the by the total size of the upper tiers in the active partitions. In some examples, increasing the size of the upper tiers for the active partitions while decreasing the total size of all of the upper tiers across all the partitions gives architecture 400 advantages over architecture 300.

According to some embodiments, the improvements of architecture 400 may also support the use of gratuitous merges (e.g., merges not triggered by the capacity thresholds of tiers $L_0$ 312 and $L_1$ 314), which further improve the storage efficiency, without having to give back all the reduced merging costs.

Figure 5:
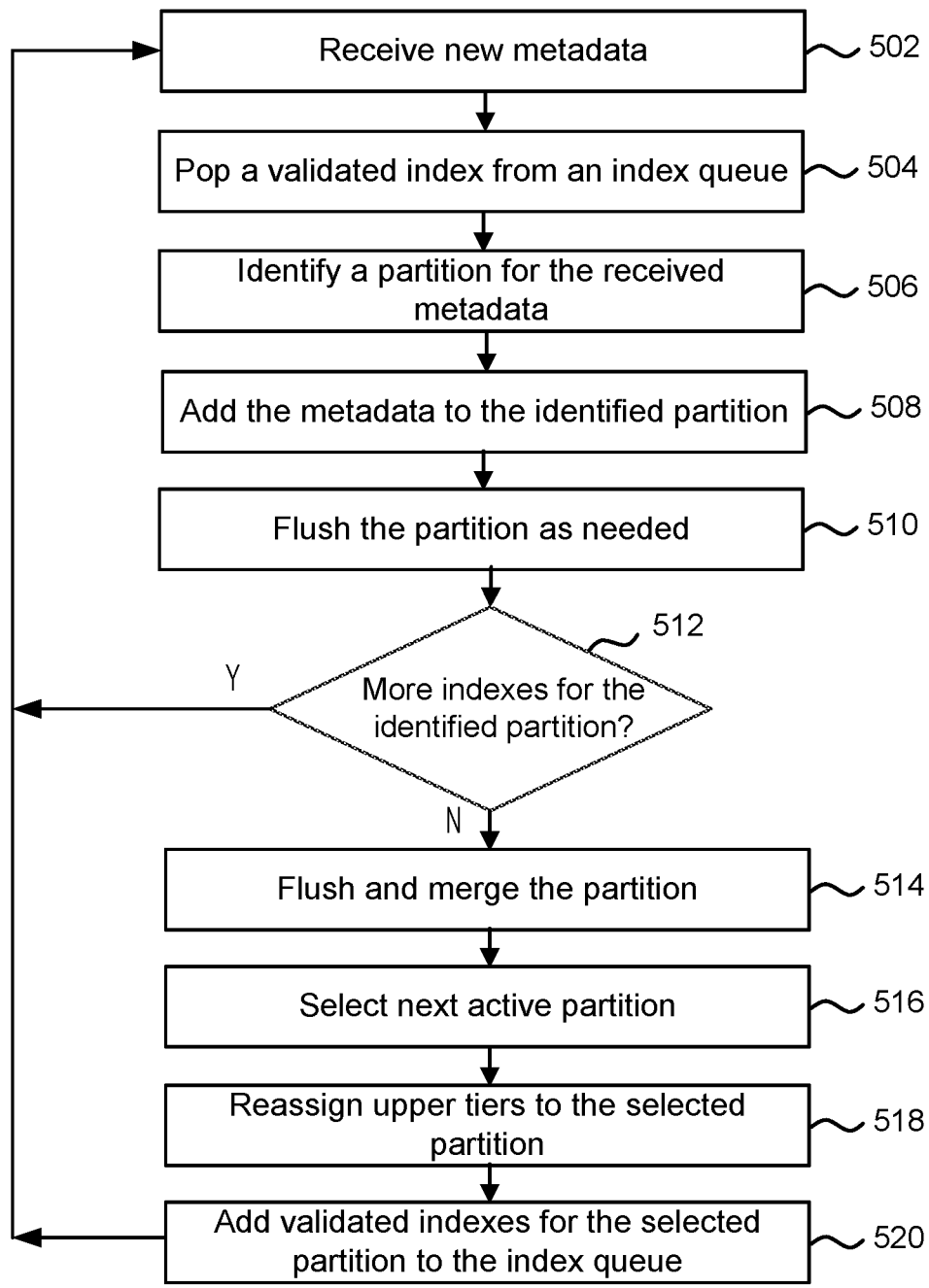
FIG. 5 is an organizational diagram of a method for maintaining metadata according to aspects of the present disclosure.

FIG. 5 is an organizational diagram of a method 500 for maintaining metadata according to aspects of the present disclosure. According to some embodiments, method 500 may be implemented by one or more processors of one or more of the storage controllers $108.a$ and/or $108.b$ of the storage system 102, executing computer-readable instructions to perform the functions described herein with respect to maintaining metadata store 116. In some examples, the processes of method 500 may be accessed and/or activated through one or more application programming interface (API) calls, remote procedure calls, and/or the like provided by the implementation of the metadata store. It is understood that additional steps can be provided before, during, and after the processes of method 500, and that some of the steps described can be replaced or eliminated for other embodiments of method 500. In some embodiments, method 500 may be used to maintain metadata stored within a metadata store organized consistent with architecture 400. In some embodiments, process 510 may be periodically triggered without first having to perform processes 502-508.

At a process 502, new metadata is received. As data is received by a storage system as part of a write operation, storage for the data to be written is allocated from a pool of one or more storage devices and new metadata for tracking the newly written data is created. This metadata may include information about the newly written data such as the storage device it is located on, where it is located on the storage device, how large it is, when it was written, and/or the like. This new metadata is then organized as a newly created metadata entry for storage in a metadata store, such as metadata store 116. In some examples, the metadata entry may correspond to a BLOB store identifier when the storage system organizes the one or more storage devices as a BLOB store.

At a process 504, a validated index is popped from an index queue, such as index queue 420. In some examples, the validated index is obtained from the head of the index queue and then removed from the index queue. The validated index identifies a partition (e.g., one of the active partitions 410) and a location within an active partition where the metadata entry created to record the new metadata received during process 502 is to be stored.

At a process 506, the active partition in which the metadata entry to be stored is identified. In some examples, the validated index includes two portions that are used as an identifier for determining a partition and a location within the partition. For example, the two portions include a first portion (e.g., the most significant bits) to identify the active partition in which to store the metadata entry, and a second portion (e.g., the least significant bits) to identify where in the active partition the metadata entry is to be stored. Depending upon the value of the first portion, the active partition (e.g., one of the partitions 410) is identified.

At a process 508, the metadata entry is added to the active partition identified during process 506. The second portion of the validated index obtained during process 504 is used to select where in the active partition the metadata entry is to be stored, but the organization within the lookup structures (e.g., the trees) of the active partition is determined to support rapid searching and lookup of the metadata entry, such as by a logical block address provided as part of a subsequent query to the metadata store. In some examples, the metadata entry is added to a tier $L_0$, such as a tier $L_0$ 412 allocated to the active partition.

At a process 510, the active partition is flushed as needed. With the addition of the metadata entry to the tier $L_0$ of the active partition, the size of the tier $L_0$ may reach a configurable size threshold, which triggers flushing of some or all of tier $L_0$ into tier $L_1$ of the active partition. In some examples, the size threshold may correspond to a fixed percentage of the size of the tier $L_0$ allocated to the active partition, such as 70 percent or more of the allocated size of tier $L_0$. In some examples, the flushing results in merging of tier $L_0$ with tier $L_1$, which may result in the addition of new metadata entries in tier $L_1$ or the replacement of metadata entries in tier $L_1$ that were superseded by metadata entries more recently added to tier $L_0$ for the same storage locations. In some examples, the merging may result in the removal of metadata entries in tier $L_1$ of other partitions that were superseded by metadata entries more recently added to tier $L_1$ for the same storage locations.

Flushing and merging of tier $L_0$ into tier $L_1$ may additionally increase the size of tier $L_1$ and, in some cases, may, trigger a merger of tier $L_1$ into tier $L_2$ with the same possibilities of adding new metadata entries to tier $L_2$ or the replacement of superseded metadata entries in tier $L_2$ of the active or other partitions. In some examples, the a merger of tier $L_1$ into tier $L_2$ may occur multiple times as method 500 cycles through processes 502-512.

In some embodiments, other criteria may trigger the flushing of tier $L_0$ into tier $L_1$. In some examples, the flushing may be triggered, as a gratuitous merge, by expiration of a configurable timer that helps ensure timely merges to control the reduction in storage efficiency due to trapped capacity within the storage devices. In some examples, the duration of the configurable timer may be set based on one or more of a type of data being written to the storage system, a size of the blocks of the data being written to the storage system, to coincide with the frequency of garbage collection sweeps by the storage system, and/or the like.

At a process 512 it is determined whether more validated indexes for the active partition identified during process 506 are available within the index queue. In some examples, indexing queue may keep track of which partitions for which the index queue has validated indexes. In some examples, when each of the indexes for the active index are queued together in the index queue, a change in the first portion of the next validated index at the head of the index queue after the pop operation of process 504 may be used to detect that the index queue no longer contains validated indexes for the active partition. In some examples, the index queue may include counters for each of the active indexes that are decremented when a corresponding validated index is popped during process 504. When the counter for the active index reaches zero, this means that the index queue is out of validated indexes for the active partition. When validated indexes for the active partition are still within the index queue, method 500 returns to process 502 to await the receiving of additional metadata. When there are no longer any validated indexes for the active partition in the index queue, method 500 proceeds to process 514 where the process of replacing the active partition with an inactive partition begins.

At the process 514, the active partition is flushed and merged. Using processes similar to the as-needed merges of process 510, tier $L_0$ of the active partition is flushed and merged into tier $L_1$ of the active and other partitions and tier $L_1$ of the active partition is flushed and merged into tier $L_2$ of the active and other partitions. This frees up the storage used by tiers $L_0$ and $L_1$ for use in another active partition. Once merged, the active partition becomes inactive.

At a process 516, a next active partition is chosen to replace the active partition that became inactive during process 514. In some examples, the next active partition may be chosen by any suitable algorithm, such as randomly, by popping from a queue of inactive partitions (i.e., so that the least recently active partition becomes the next active partition), based on properties of the inactive partitions, and/or the like. In some examples, the properties of the inactive partitions may include the corresponding sizes of each of the inactive partitions (e.g., based on the number of metadata entries in the corresponding tier $L_2$) with the next active partition being chosen as the inactive partition with the smallest tier $L_2$.

At a process 518, the tiers $L_0$ and $L_1$ emptied by the merges of process 514 are assigned to the next active partition chosen during process 516. In this way, the reassigned tiers $L_0$ and $L_1$ are made available for use when metadata entries are added to the next active partition.

At a process 520, validated indexes for the next active partition are added to the index queue. In some examples, the number of validated indexes to add to index queue may be set to a configurable number or may be selected based on a size of the tier $L_2$ in the next active partition. In some examples, the validated indexes are added to the tail of the index queue or inserted at other locations within the index queue using a suitable algorithm. In some examples, the algorithm may include inserting the validated indexes at random locations, via equally spaced distribution, and/or the like. In some examples, when the index queue includes counters for each of the active partitions, the counter associated with the next active partition is set to the number of validated indexes for the next active partition added to the index queue.

Once the validated indexes are added to the index queue by process 520, method 500 repeats by returning to process 502 to receive additional metadata.

As discussed above and further emphasized here, FIGS. 4 and 5 are merely examples which should not unduly limit the scope of the claims. One of ordinary skill in the art would recognize many variations, alternatives, and modifications. In some embodiments, the number of tiers within the partitions 410 may be different from three. In some examples, when just two tiers are used, the various tiers $L_1$ 414 allocated to the partitions are omitted and processes 510 and 514 are correspondingly simplified. In some examples, when four or more tiers are used, one or more of the additional tiers (e.g., between tier $L_1$ and tier $L_2$) may be treated similarly to tiers $L_0$ 412 and $L_1$ 414 and allocated just to active partitions and subject to the merging of process 514 to free them up or treated similarly to tier $L_2$ 416 with versions being located in all the partitions. In some examples, when three tiers are used, tier $L_1$ 414 may alternatively be treated like tier $L_2$ 416 and included in each of the partitions.

In some embodiments, index queue 420 may be organized as a collection of queues. With each of the queues in the collection being assigned to a subset of the active partitions. In some examples, each active partition may have its own queue, or each queue may be shared among two or more of the active partitions. In some examples, popping of a validated index from the index queue, such as during process 504, may include popping the validated index from a selected one of the queues. In some examples, the queue may be selected using any suitable algorithm including randomly, via round robin, via least recently popped, and/or the like. In some examples, the use of multiple queues provides good distribution of new metadata entries among the active partitions.

In some embodiments, index queue 420 may be omitted an replaced with another suitable mechanism for identifying a next candidate index with corresponding changes to processes 504 and/or 520. In some examples, a random number generator could be used to generate an index, and the index could be validated by determining whether the corresponding location is in use. In some examples, the random number generator may generate two random numbers, a first random number to identify a partition from the active partitions and a second random number to determine the location within the partition.

As a result of the elements discussed above, embodiments of the present disclosure improve upon storage system technology. For example, embodiments of the present disclosure enable the storage system 102 to more efficiently process metadata changes during storage operations, more efficiently utilize the storage devices 106, and reduce the overall costs of using a tiered metadata store.

In some embodiments, the computing system is programmable and is programmed to execute processes including the processes of method 500 discussed herein. Accordingly, it is understood that any operation of the computing system according to the aspects of the present disclosure may be implemented by the computing system using corresponding instructions stored on or in a non-transitory machine-readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   creating, by a storage controller, a metadata entry associated with data received with a write operation; and
   storing, by the storage controller, the metadata entry into a metadata store, the metadata store comprising a plurality of active partitions and a plurality of inactive partitions including:
      popping an index from a queue identifying locations in the plurality of active partitions where the metadata entry may be stored, each of the plurality of active partitions are allocated respective storage locations in a first tier storage pool and in a second tier storage pool, and each of the plurality of inactive partitions are allocated respective storage locations in the second tier storage pool and not allocated storage locations in the first tier storage pool;
      identifying a first active partition from the plurality of active partitions and a first storage location within the first tier storage pool and associated with the first active partition based on the index; and
      storing the metadata entry in the first storage location.

2. The method of claim 1, further comprising:
   flushing metadata entries stored in the first tier storage pool and associated with the first active partition, including merging the metadata entries into the second tier storage pool.

3. The method of claim 1, further comprising:
   flushing metadata entries stored in the first tier storage pool and associated with the first active partition in response to the first tier storage pool reaching a first size threshold.

4. The method of claim 1, further comprising:
   adding, in response to the queue no longer containing locations associated with the first active partition, locations associated with a second active partition of the plurality of active partitions to the queue.

5. The method of claim 1, further comprising:
   selecting, in response to the queue no longer containing locations associated with the first active partition, a first inactive partition from the plurality of inactive partitions to be a part of a second active partition.

6. The method of claim 1, wherein the index comprises a first portion identifying the first active partition and a second portion identifying the first storage location.

7. The method of claim 1, wherein the queue comprises a plurality of counters for tracking a number of indexes associated with each of the plurality of active partitions.

8. The method of claim 1, wherein the queue comprises a plurality of second queues, each of the second queues identifying locations in respective ones of the plurality of active partitions.

9. A non-transitory machine-readable medium having stored thereon instructions for performing a method comprising machine executable code which when executed by at least one machine, causes the machine to:
   create a metadata entry associated with data received with a write operation; and
   store the metadata entry into a metadata store, the metadata store comprising a plurality of active partitions and a plurality of inactive partitions including:
      pop an index from a queue identifying locations in the plurality of active partitions where the metadata entry may be stored, each of the plurality of active partitions are allocated respective storage locations in a first tier storage pool and in a second tier storage pool, and each of the plurality of inactive partitions are allocated respective storage locations in the second tier storage pool and not allocated storage locations in the first tier storage pool;
      identify a first active partition from the plurality of active partitions and a first storage location within the first tier storage pool and associated with the first active partition based on the index; and
      store the metadata entry in the first storage location.

10. The non-transitory machine-readable medium of claim 9, wherein the machine is further caused to:
    flush metadata entries stored in the first tier storage pool and associated with the first active partition, including merging the metadata entries into the second tier storage pool.

11. The non-transitory machine-readable medium of claim 9, wherein the machine is further caused to:
    flush metadata entries stored in the first tier storage pool and associated with the first active partition in response to the first tier storage pool.

12. The non-transitory machine-readable medium of claim 9, wherein the machine is further caused to:
    add, in response to the queue no longer containing locations associated with the first active partition, locations associated with a second active partition to the queue.

13. The non-transitory machine-readable medium of claim 9, wherein the machine is further caused to:
    select, in response to the queue no longer containing locations associated with the first active partition, a first inactive partition from the plurality of inactive partitions as a second active partition.

14. A computing device comprising:
    a memory containing machine-readable medium comprising machine executable code having stored thereon instructions for performing a method of maintaining a metadata catalog; and
    a processor coupled to the memory, the processor configured to execute the machine executable code to cause the processor to:

create a metadata object for storing metadata associated with data received with a write operation; and store the metadata object into the metadata catalog, the metadata catalog comprising a plurality of active portions and a plurality of inactive portions including:

extract a first index from a list identifying locations in the plurality of active portions where the metadata object may be stored, each of the plurality of active portions are allocated respective storage locations in a first layer storage pool and a second layer storage pool, and each of the plurality of inactive portions are allocated respective storage locations in the second layer storage pool and not allocated storage locations in the first layer storage pool;

identify a first active portion from the plurality of active portions and a first storage location within the first layer storage pool and associated with the first active portion based on the first index; and store the metadata object in the first storage location.

15. The computing device of claim 14, wherein the processor is further caused to:

flush metadata entries stored in the first layer storage pool and associated with the first active portion, including merging the metadata entries into the second layer storage pool.

16. The computing device of claim 14, wherein the processor is further caused to:

add, in response to the list no longer containing indexes associated with the first active portion, indexes associated with a second active portion of the plurality of active portions to the list.

17. The computing device of claim 14, wherein the processor is further caused to:

select, in response to the list no longer containing indexes associated with the first active portion, a first inactive portion from the plurality of inactive portions to be a part of a second active portion.

18. The method of claim 1, further comprising:

reassigning a portion of the first tier storage pool that is associated with the first active partition to a second active partition in response to the queue no longer containing locations associated with the first active partition.

19. The computing device of claim 14, wherein the processor is further caused to:

determine, based on a size of a portion of the second layer storage pool associated with an active portion, a number of indexes to add to the list identifying locations in the plurality of active portions.

20. The method of claim 1, further comprising:

flushing metadata entries stored in the first tier storage pool and associated with the first active partition in response to an expiration of a timer, a duration of the timer being based on properties of the data.

* * * * *